United States Patent
Begley et al.

(10) Patent No.: US 6,360,246 B1
(45) Date of Patent: Mar. 19, 2002

(54) REPORT GENERATION ARCHITECTURE FOR REMOTELY GENERATED DATA

(75) Inventors: Thomas Begley, Great Falls, VA (US); Peter Nash, Cheverly, MD (US); Paul O'Connell, Ashburn, VA (US); Mark Snuffin, Bethesda; Stephen Jouflas, Frederick, both of MD (US)

(73) Assignee: The Nasdaq Stock Market, Inc., Washington, DC (US)

( * ) Notice: Subject to any disclaimer, the term of this patent is extended or adjusted under 35 U.S.C. 154(b) by 0 days.

(21) Appl. No.: 09/191,655

(22) Filed: Nov. 13, 1998

(51) Int. Cl.[7] .............................................. G06F 15/16
(52) U.S. Cl. ...................................... 709/203; 709/217
(58) Field of Search .............................. 709/223, 224, 709/201, 203, 217, 219

(56) References Cited

U.S. PATENT DOCUMENTS

| | | | | |
|---|---|---|---|---|
| 5,748,188 A | * | 5/1998 | Hu et al. ..................... | 707/101 |
| 5,809,266 A | * | 9/1998 | Touma et al. ................ | 707/104 |
| 6,055,541 A | * | 4/2000 | Solecki et al. .............. | 707/103 |
| 6,065,002 A | * | 5/2000 | Knotts et al. ................. | 707/4 |
| 6,078,924 A | * | 6/2000 | Ainsbury et al. ........... | 707/101 |
| 6,085,191 A | * | 7/2000 | Fisher et al. ................... | 707/9 |
| 6,105,043 A | * | 8/2000 | Francisco et al. ........... | 707/513 |

* cited by examiner

Primary Examiner—Mehmet B. Geckil
(74) Attorney, Agent, or Firm—Fish & Richardson P.C.

(57) ABSTRACT

A process for generating reports from a desktop application program residing on a server computer system is described. The process can deliver such reports over a network computer system and includes a data services process that maintains state information of report generation objects, an object management process that manages the report generation objects and that encapsulates instances of a desktop application to produce reports based on data supplied by the data server process in accordance with the report generation object. Subscribers can request reports containing data which are dynamically generated at request time. One example of such reports are reports containing financial data.

18 Claims, 6 Drawing Sheets

REPORT GENERATION ARCHITECTURE FOR REMOTELY GENERATED DATA

BACKGROUND

This invention relates to report generation in a distributed computing processing environment.

The Internet and, in particular, the world wide web portion of the Internet, has grown to be of significant importance in delivering information to users. One use of the Internet is to deliver information to subscribers. This information can be in various forms and can be provided using various presentation techniques.

Current systems available for delivering information typically involve a user requesting a download of some information that already exists on a server.

SUMMARY

Subscribers to data providing systems can request reports containing data which are dynamically generated at request time. One example of such reports are reports containing financial data. For such reports, several characteristics are important. One characteristic is that the reports are generated from current data. A second characteristic is that the reports are dynamically generated from data that is retrieved from a database. Thirdly, the reports are often intended for an executive level audience in large corporations. Therefore, in addition to containing accurate data, the reports should be of presentation quality.

According to an aspect of the invention, a process for generating reports from a desktop application program residing on a server computer system for delivery over a network computer system includes a data services process that maintains state information of report generation objects. The data services process transfers data to satisfy report generation objects. The process also includes an object management process that manages the report generation objects that are sent to the data services process. The object management process includes a report agent process that instantiates instances of a report generation object that encapsulates instances of the desktop application to produce reports based on data supplied by the data services process, in accordance with a particular instance of the report generation object. The process also includes a user interface process that manages report requests that are fed to the data services process.

According to a further aspect of the invention, a computer program product resides on a computer readable medium for generating reports from a desktop application program. The product can reside on a server computer and includes instructions for causing the server computer to produce report generation objects in response to a user request for a report and maintain state information of report generation objects. The program also includes instructions that cause the computer to transfer data to satisfy report generation objects and instantiate instances of report generation objects that encapsulate instances of the desktop application to produce reports, in accordance with the report generation object.

According to a still further aspect of the invention, a networked computer system includes a plurality of client systems and at least one server system. The server system is coupled to the client systems by a network and the server system includes a database and a server process for generating reports. The server process includes a data services process that maintains state information of report generation objects and transfers data from the database to satisfy report generation objects. The server process also includes an object management process that manages the report generation objects that are sent to the data services process. The object management process includes a report agent process. The report agent process instantiates instances of a report generation object that encapsulates instances of the desktop application to produce reports based on data supplied by the data services process. The data services process retrieving the data from the database in accordance with a particular instance of the report generation object. The server process also includes a user interface process that manages report requests that are fed to the data services process.

One or more advantages can be provided from the above. The report generation facility can have the capacity to handle a large volume of report requests. The report generation architecture uses a desktop application as a server application. By encapsulating instantiations of the application it permits it to run as a server designed application. The report generation architecture minimizes the impact of a large number of requests on server response time. This can enable the server to have a high response rate or indeed, mitigate crashes of the server. While maintaining performance the report generation architecture enables the use of the presentation qualities found in desk-top applications.

DETAILED DESCRIPTION

Figure 1:
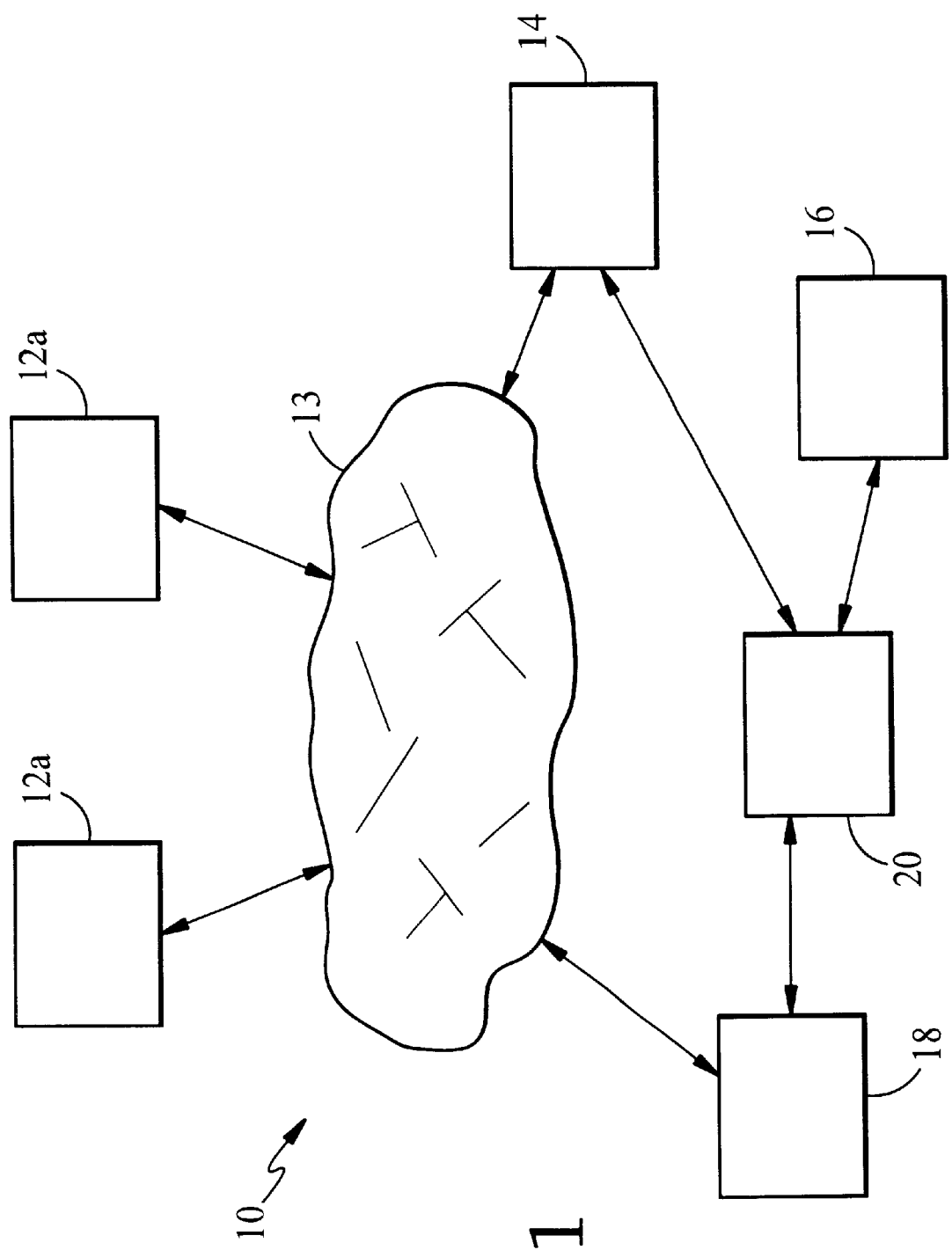
FIG. 1 is a block diagram of a report transfer architecture incorporating a distributed network.

Referring now to FIG. 1, a document delivery system 10 includes a plurality of client stations 12a, 12b that are coupled to a report generation system 20 via a distributed network 13. The distributed network 13 can be the Internet and particularly the world wide web portion of the Internet. Other distributed network arrangements, however, could be used. Clients 12a–12b can subscribe to a server based process. One example of such an arrangement could be The Nasdaq Stock Market Online® system (hereinafter the Nasdaq Online® system). Subscribers to the Nasdaq Online® system can request reports that are dynamically generated and contain current financial data for a subscriber's listings on the Nasdaq stock exchange. That is, security dealers can obtain, at the time of the request, the most current information in the Nasdaq Online® system pertaining to securities for which the dealer makes a market. This is but one example of the use of the report generation system 20 that will be described below.

For reports such as the one described above, several characteristics are important. One characteristic is that the reports are generated from current data which is current at the time that a subscriber submits a request over the distributed network system 13. The data can be any type of data with financial data that can change quite frequently being a particular good illustrative example. A second characteristic is that the reports are dynamically generated using the most current data available. That is the reports are not necessarily canned reports, although the report formats can be standardized and reports that are generated can be stored for later delivery. Thirdly, the reports are often intended for an executive level audience. Therefore, in addition to containing accurate data, the reports should be of high presentation quality.

The above is but one example and other financial markets could also use the report generation system 20. In addition, the system 20 is not limited to production of financial data. In general, the system 20 can be used to provide any data, particularly when one or more of the following characteristics are needed, i.e., the reports are generated from current data, from a request over a distributed network, the reports are dynamically generated, or intended for an executive level audience requiring high presentation quality.

The system 10 uses the client 12a–12b to communicate with the report server 20 preferably via a web browser. The clients 12a–12b communicate with the report server 20 through a gateway 14 over the distributed network 13. The gateway 14 transfers client requests to the report server 20 in a generally conventional manner. The report server 20 transfers data requests to a remote database 16 that may contain, for example, financial information that is constantly changing. The report server 20 generates a report using the report generation capabilities of a standard desk-top application program that is instantiated for each report request. The server can handle a large number of instantiations of the desk top application program report generator.

The report server 20 transfers a report, that was generated by the instantiation of the desk top application program report generator, back to the one of the requesting clients 12a–12b via one of two options. For example, the report generator 20 can use a mail server 18 to e-mail the report back to the client 12a, 12b or, alternatively, can permit the client 12a, 12b to simply download a report using conventional hyper-text markup language (HTML) and web browser capabilities.

Figure 2:
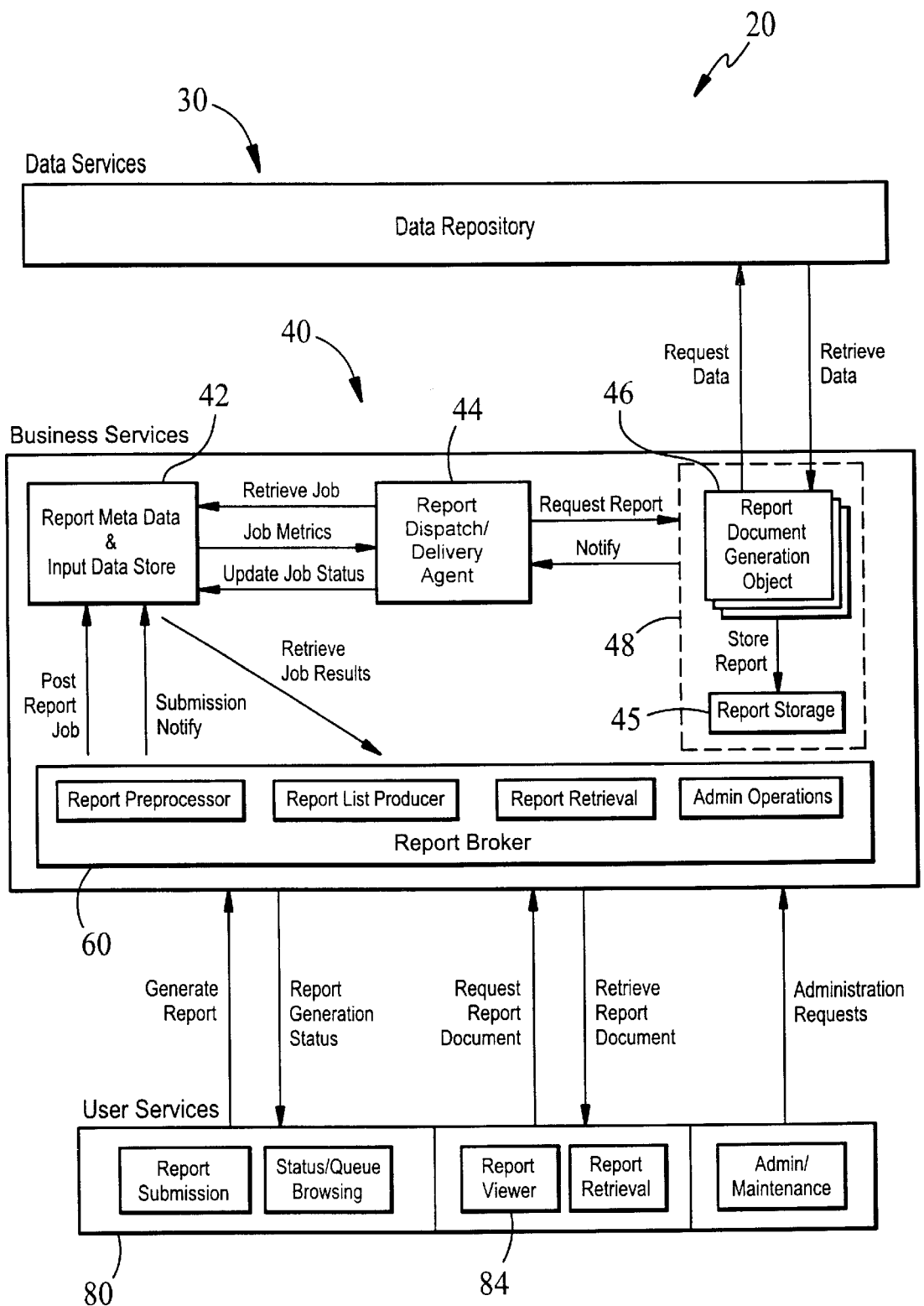
FIG. 2 is a block diagram of a report generation architecture used in the system of FIG. 1.

Referring now to FIG. 2, the report generator architecture 20 includes a data services layer 30 that communicates with a report repository such as the Nasdaq Online® system mentioned above. The data services layer 30 receives a request data message from report generator 40 and returns retrieved data to the report generator 40, as will be described below. The data services layer 30 uses an SQL (structured query language) server (not shown) to maintain state information for all current and satisfied report requests. This data services layer 30 controls creation and delivery of report documents in a fault tolerant manner to the report generator 40.

The report generator process 40 includes a business services layer 50 and a report broker 60. The business services layer stores report metadata and input data that is used for producing reports. The business services layer 60 acts a governing object to manage many report servers, i.e., report production objects. The report generator process 40 also includes a report agent 44 that dispatches report requests to report document generation objects 46 that are instantiated by a report server 48. The report generation objects 46 are responsible for interfacing report requests made to the report generator process 40 to the data services layer 30. The report generation object 46 is also responsible for notifying the report agent 44 of the status of the report and for storing a generated report in persistent storage 45. The report generator process 40 also includes a report broker layer 60 that includes a preprocessor, report list producer, report retrieval and administrative functions.

Clients 12a–12b interface to the report generation architecture 20, via a user services layer 80. The user services layer 80 generates report requests to the report generator process 40 and receives report generation status responses from the report generator process 40. The user services layer 80 uses Active Server Pages to manage report requests and output listings. Active Server Pages (Microsoft Corp.) are components used to produce server-side scripted templates that generate dynamic, interactive web server applications. Active Server Pages allow embedding of special program codes in standard hypertext markup language (HTML) pages. These codes can be used to access data in a database and so forth. The HTML output by an Active Server Page is used by a client web browser. The user services layer 80, therefore, includes for example a report viewer 84 that can be a full registered version of an application program that is used to generate the report presentation, as will be described below.

Suffice it here to say that the report generator 40 uses a conventional desktop application, as a server application in a server environment. The report generation architecture 20 allows a conventional desktop application to handle a plurality of requests for dynamically generating reports. Several advantages can be provided by this arrangement. For example, many desktop applications have very good report generation facilities that can structure data into visually pleasing formats for presentation. Often, such capabilities are not easily available on legacy server or mainframe based software applications. In addition, the report generation capabilities of conventional web browsers are also generally limited in features and scope. The report generation architecture 20 therefore permits a user to access such a legacy server application to obtain the data, via the client web browser, while the report generation architecture 20 instantiates the desktop application on the server 20 and can launch the desktop application on the client, to generate the report without any intervention by the user. Therefore this feature simplifies report generation for the requesting user. The report generation architecture 20 is capable of handling a large plurality of such requests using the desktop application.

Figure 3:
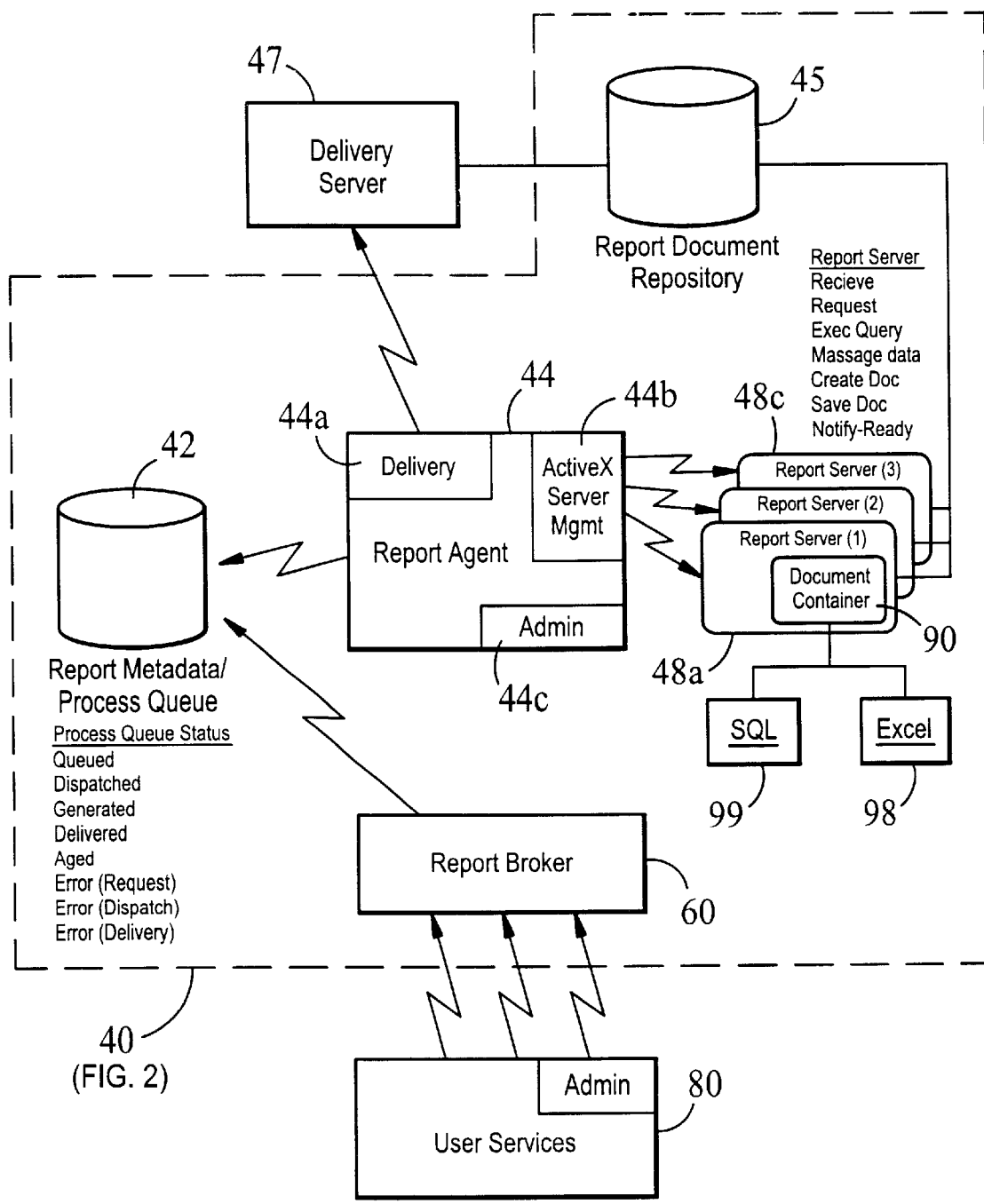
FIG. 3 is a block diagram showing details of the report generation architecture of FIG. 2.

Referring now to FIG. 3, the report generation architecture 40 (FIG. 2) includes a report agent 44 with delivery 44a, active X server management 44b and administrative 44c interfaces. These elements are COM (Common Object Model, Microsoft Corp.) based interfaces. The report agent interface includes a report request persistence storage process, a report request life cycle management process, as well as support for interactive processes and delivery and storage of report documents. The report agent 44 produces instances of a report server 48a–48c, as shown. The report server processes report requests that are received from the report agent 44. When the report server 48a–48c accepts a report request, it notifies the report agent that it is currently busy. The report server 48a–48c queries the database 16 (FIG. 1) to retrieve detailed information on the current item being requested, for example, report types and parameters associated with the report. The query is based on a standard format for the particular database that is accessed. The query process can also include a parser (not shown) and filters (not shown) to convert user specified requests into a format suitable for searching the database such as structured query language (SQL).

Figure 5:
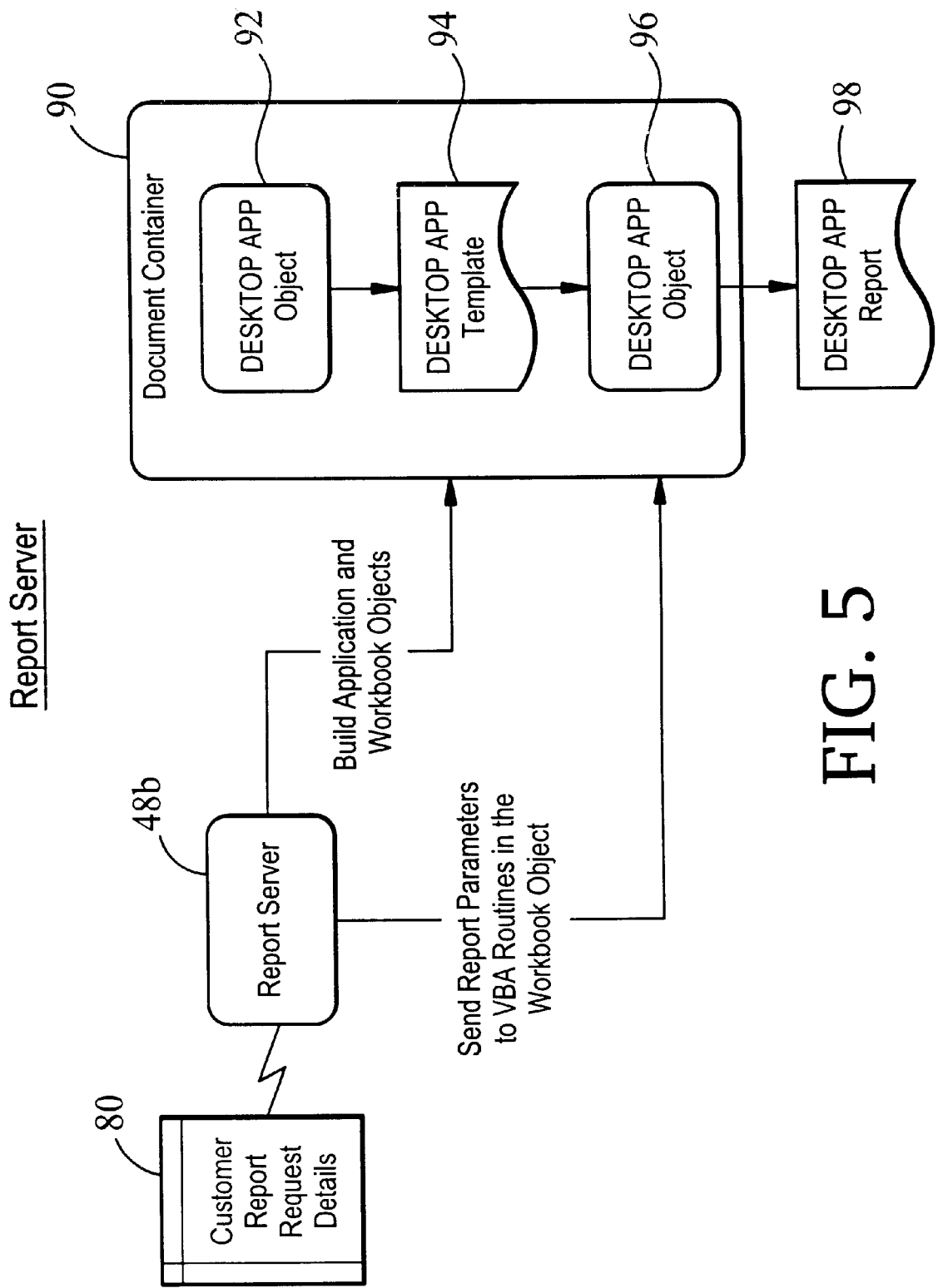
FIG. 5 is a block diagram of details of the report server.

Each of the report servers include a document container 90. The document container 90, as will be further described in conjunction with FIG. 5, is used to encapsulate the desktop application and permit instantiations of the desktop application for each one of the report servers 48a–48c. The report agent 44 also uses its delivery interface 44a to deliver status messages to a delivery server 47 that can control the persistent storage of report documents on a persistent store 45. The report broker 60 communicates with the report agent 44, via the report metadata process queue 42, and receives requests through the user services layer 80.

The report agent 44 handles each report request submitted by the Nasdaq Online system. The report agent 44 stores each report request in the persistent data store 45 provided as a set of database entities. All components of the reporting system can use this data store 45 to get information concerning the report requests. The data store 45 also maintains the state of each report request as the report request moves through a processing life cycle.

Figure 4:
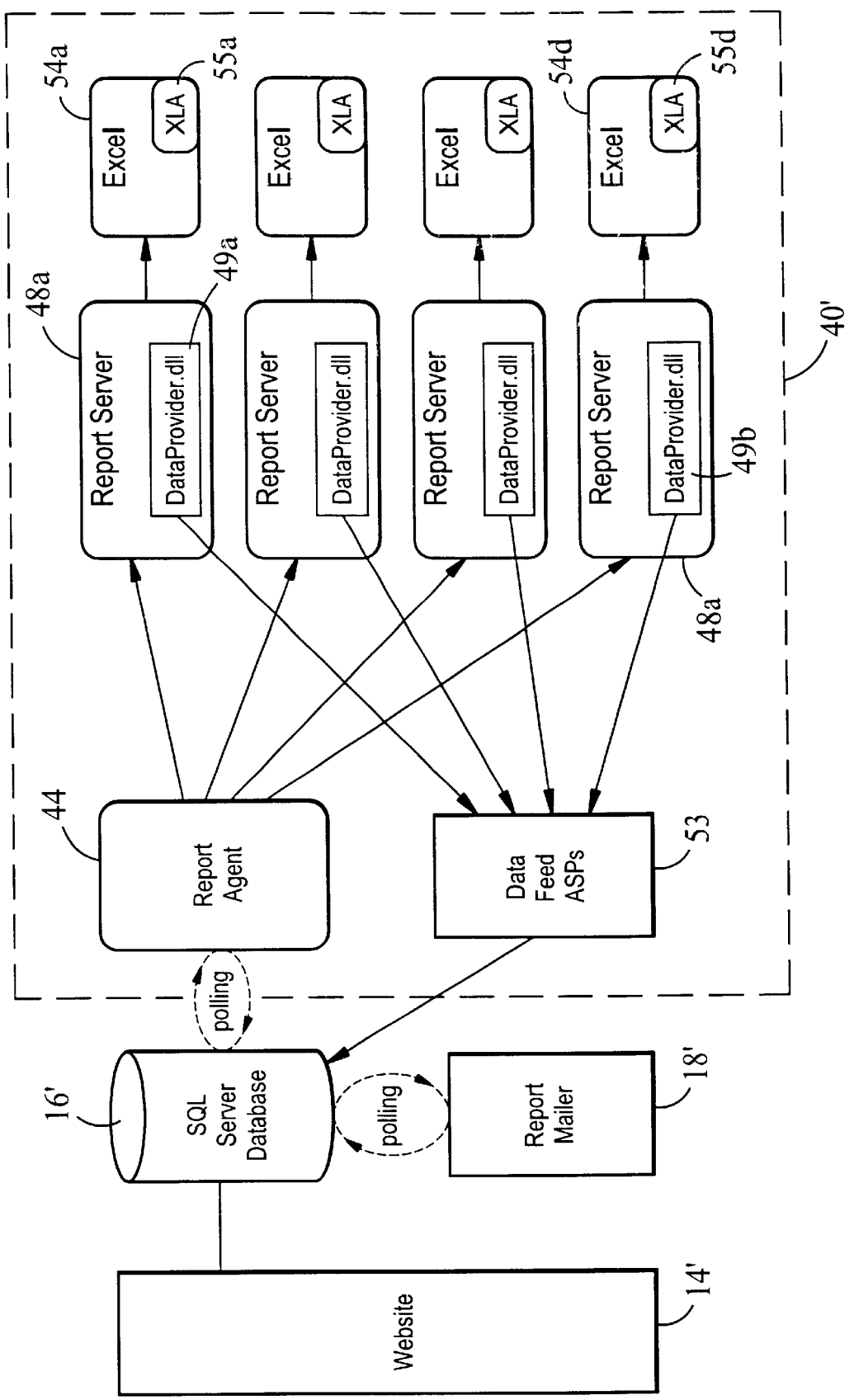
FIG. 4 is a block diagram of a report generation process used in the system of FIG. 2.

Referring now to FIG. 4, an example 40' of the report generation process 40 is shown. The flow in FIG. 4 is based on an "acted upon" flow. Thus, FIG. 4 shows the flow of one element e.g. the report agent 44 acting upon another element e.g. the report servers 48a–48d. The report generation process 40' generates presentation quality reports across a broad spectrum of client platforms. The report generation process 40' quickly and accurately delivers presentation quality report files to requesting clients 12a–12b. These reports can be delivered and customized for thousands of users. The architecture uses a document formatting capability of a conventional off the shelf desktop application such as Microsoft Excel 97 which is part of the Microsoft Office 97 suite of applications Microsoft, Inc. Redmond Wash.

Reports are produced by decomposing a user's report request to determine what report information is needed. The query is fed to the database 14' to retrieve the information to derive a single report. The Data Feed Active Server Pages 53 are used to retrieve the information for the report. The information can be preprocessed by the query and produced into a document report, such as by inserting the information into a report generator used in a desktop application such as Excel. The SQL database server 16' is used to store queued report requests and the metadata responsible for producing the reports. The metadata is used to control the report agent 44 and report server 48a–48d during processing. Report tables are designed so that a single request can contain a one to many reports relationship and a single report can have a one to many parameter relationship.

The report agent 44 acts as a middle layer that is positioned between the Nasdaq Online system 14' and the report server 48. The report agent 44 can be implemented as an active executable with a set of SQL server stored procedures. The report agent 44 manages the report servers 48a–48d that are dynamically scaled to support a current workload of a queue. The agent can distribute queued report generation requests to the pool of report servers 48a–48d. The agent 44 and report servers 48a–48d communicate, via a callback mechanism based on a distributed protocol.

The report agent 44 polls the database 16' and can retrieve a plurality of report requests at a time and can arrange these requests into a batch. The report agent 44 is responsible for distributing items in the batch to report servers 48a–48d, as the items become available. Once an entire batch is finished, the report agent updates each item to its proper status in the database 16' and retrieves the plurality of reports requests.

The report agent 44 instantiates each one of the instances of the report server 44a–44d (FIG. 4). The report servers 44a–44d each include a data provider object which is a dynamic link library (.dll) file that encapsulates the data retrieval process. This object can simulate a standard browser by using the so-called "WinInet.dll" and can retrieve report information using the data feed ASP files 53 via the DataProvider .dll in each report server.

The business data provider object (DataProvider.dll) and data returned from the database 16' enable the report server to retrieve actual report data. Actual report data can be retrieved using Active Server Pages which are maintained in the Active Server Pages data feed 53. Report specific Active Server Pages (ASP) are produced to mirror corresponding pages found on a web site in terms of the data presented. That is, the report specific active server pages contain the same data as the web site (e.g., Nasdaq Online) except the data does not need any formatting associated with it. The data in the ASP pages are sent to the desktop application such as Excel.

The results from these pages are arranged into a defined array structure and passed along to an instantiation of the desktop application 54a–54d such as Excel for processing into a report. The instance of the desktop application 54a–54d receives the data in a format that it can handle and processes it in normal manner. Similarly, many other request for the same or different data from the same or different users are processed by different instantiations of the desktop application 54a–54d. Use of the report processing facility of the desktop application can insure that a high quality report is generated. Often, applications, such as browsers used to generate report from data off of the web, do not have the presentation quality features of desk top applications.

The report agent 44 provides a communication link between the desktop application e.g., Excel, and the report server process 40. There are different array structures set up for each report type. The report types can be any standard or custom financial report such as a history report, transaction report, short position report, ownership report, and so forth. Of course if the report generation system 20 is used with different types of information (i.e., other than financial information) different types of reports can be produced. Upon completion, notification messages are passed back up the chain from the desktop application to the report server process 40 back to the report agent 44. Once completed, the report server process 40 can notify the report agent 44 that it is ready for another request.

A single request can contain a single report. The report agent 44 includes a plurality of structures to manage the report generation processing including an RPT_QUEUE table that stores general user request information, for example, a report ID queue, a user name report status and which is independent of the actual report to be built. A second table is a RPT_QUERY_LIST TABLE that stores information on the reports contained in the requests, for example, report type. A third table is a RPT_PARAM_LIST TABLE that stores information on report parameters, for example, the start date and end date. Each table is queued off of the report queue ID field.

Each report request follows a life cycle defined by a set of statuses. The report agent 44 maintains the status of a report request throughout the report generation process 40. The statuses can be defined as, "queued", "processing", "generated", "mailed", or "aged." A "queue" status contains report requests that are received by the report generation process 40. A "processing" status is used to indicate that a report request has been moved from a queue status and is currently being processed by a report server 48a–48d. A "generated" status indicates that a report has been generated in response to a report request and a document satisfying the request is now available on the web site. The report is available through the client browser via a down load or to the client via E-mail. A "mailed" status indicating that a report has been mailed by the mail server 18 (FIG. 1) to the requester if e-mail delivery was specified by the requester. If a user requests a down load, the system will send a file containing the report and can launch the underlying desktop application (e.g., Excel) from the client browser.

A report status of "aged" can also be implemented to indicate that a report that was generated has old data. The process can include a purging process that will periodically purge aged reports.

In addition, error statuses can be implemented. For example, for each one of the queue process and mailing statuses an error queue can be defined. The error queue is used to track problems that had arose in generating and delivering reports. The error queue is also used to track report requests that were not fulfilled and will cause the system 20 to retry processing of the requests in the error queue. Therefore, an "error queue" process can be implemented to indicate that the report agent 44 encountered an error while queuing the report. Similarly, an "error processing" status can indicate that the report agent 44 encountered an error while generating a report and an "error mailing" status indicating that the report agent 44 encountered an error while delivering the report.

Referring now to FIG. 5, interactions between the report server 48b and a document container 90 that contains a desktop application are shown. A report server 48 illustratively 48b receives report requests via the user services layer and broker 60 (FIG. 2). The report server 48b builds an application object and a document container 90 to encapsulate or house application and workbook objects. The document container 90 contains the desktop application object 92, a desktop template 94 and a desktop application object 96 to produce the desktop application generator report 98.

Object 90 is a container object that holds an instantiation of the desktop object 92 (e.g., an instance of Excel), the desktop template object 94 is a template used to format data from the ASP data provider into the report format e.g., an Excel ".XLA" template). The desktop application object 96 that is the actual code within the desktop template object 96 e.g., the ".XLA" template, that performs all of the data manipulation and formatting for report presentation. The actual desktop application file 98 (e.g., a ".XLS" file for Excel) is produced by executing the code, i.e., desktop application object 96, in the desktop template object 94 on the data provided from the ASP pages via the DataProvider object in one of the report servers 48a–49d. Therefore, the container object 90 is essentially the container that holds all of the objects 92, 94 and 96 in an object-oriented sense. It is essentially an expansion of the report server e.g., report server 48b.

The container 90 produces a file 98 and is responsible for the logical succession from generation of desktop application object 92, desktop application template 94, and desktop application object 96, to generate the desktop report file 98. This encapsulation i.e., the container 90, actually allows a desktop application, such as Excel, to be instantiated and run many times by adding to a system instances of the desktop application.

Figure 6:
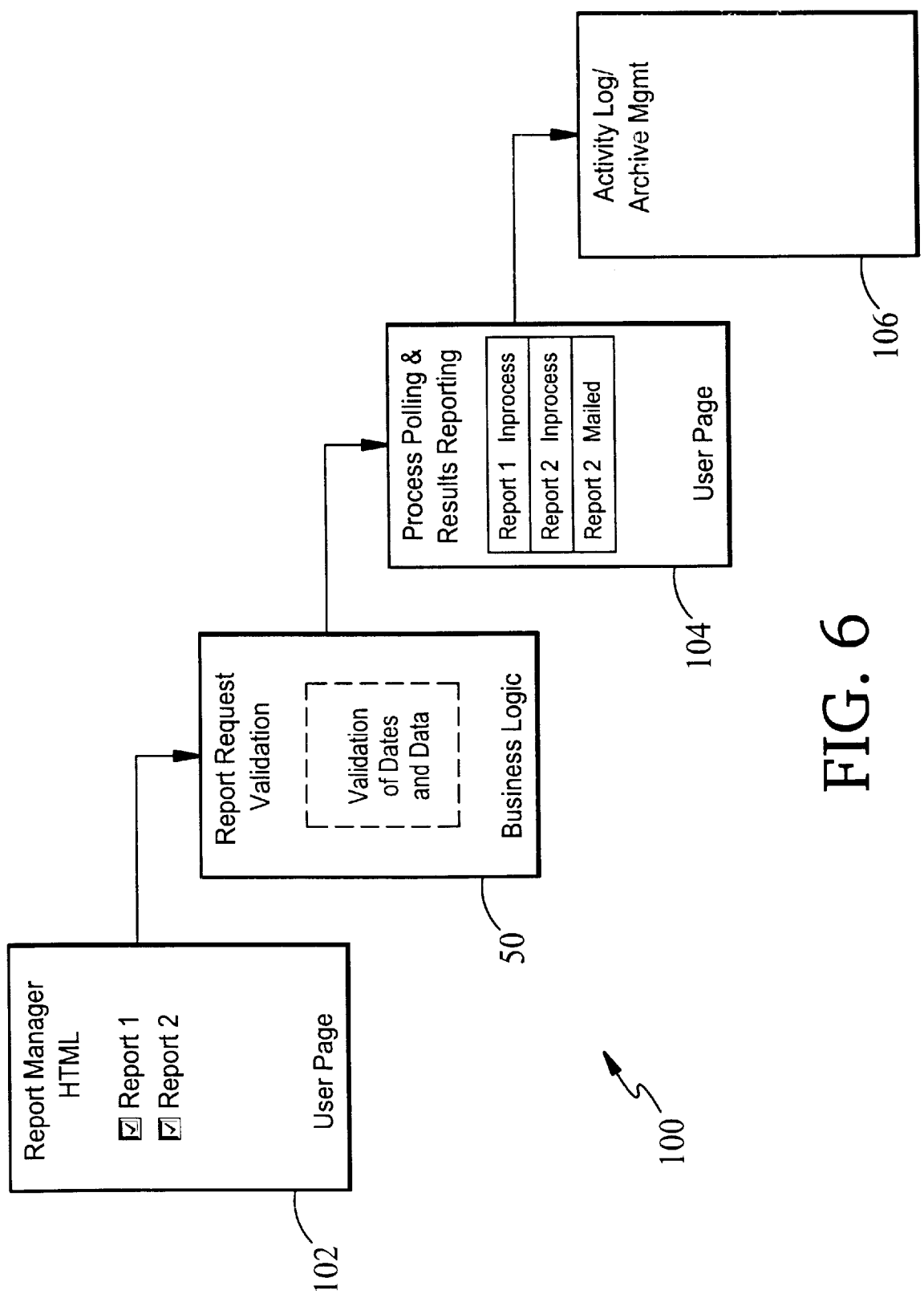
FIG. 6 is a block diagram of a data flow in the report request process.

Referring now to FIG. 6, a system flow 100 is shown. The user receives a first one of the pages e.g., user page 102 that can allow a user to select various reports shown as Report 1, Report 2, (e.g., a quick view last sale report and a short position report and so forth). When a user requests one or more of the reports, the business services layer 50 in the report generation process 20 validates data submitted to build the report. The request goes to a processing queue and the user can be informed that the report is being processed or is queued or has been processed. This information is returned to the user via a page 106. The page 106 shows the queues for all user reports. The report generation process includes an activity log 106. The activity log 106 tracks who requested a report, when the report was requested, what the parameters were for that report, and so forth. The error queue would appear in the user page and is tracked in the activity log.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A process for generating reports from a desktop application program residing on a server computer system for delivery over a network computer system comprises:
   a data services process that maintains state information of report generation objects and transfers data to satisfy report generation objects;
   an object management process that manages the report generation objects that are sent to the data services process, said object management process including:
      a report agent process that instantiates instances of a report generation object that encapsulates instances of the desktop application to produce reports based on data supplied by the data services process in accordance with a particular instance of the report generation object; and
   a user interface process that manages report requests that are fed to the data services process.

2. The process of claim 1 wherein the object management process further comprises a report agent process that manages a plurality of report server processes, said report server processes assembling information for inclusion in a report.

3. The process of claim 1 wherein the report agent process includes an interface process that provides a persistent storage process for a report request.

4. The process of claim 2 wherein the report agent process provides a standard interface that provides an external interface to query, status, statistics and information relevant to reporting a status of the report server execution.

5. The process of claim 2 wherein the report agent delivers reports to clients using an electronic mail delivery mechanism.

6. The process of claim 2 wherein the report agent delivers reports to a client based on a file that is send to a client browser.

7. The process of claim 1 wherein the report generation object includes a container object.

8. The process of claim 7 wherein the container object includes the particular instance of the desktop application object, and an instance of a template object.

9. The process of claim 8 wherein the container object produces a desktop application file by executing the code in desktop application object in the desktop template object on the data provided from the data services layer.

10. A computer program product residing on a computer readable medium for generating reports from a desktop application program residing on a server computer, the program comprising instructions for causing the server computer to:
   produce report generation objects in response to a user request for a report;
   maintain state information of report generation objects;
   transfer data to satisfy report generation objects;
   instantiate instances of a report server process, said report server process encapsulating instances of the desktop application to produce reports based in accordance with the report generation object.

11. The computer program product of claim 10 further comprising instructions for causing a computer to
   produce a report agent to manage the instances of the report server.

12. The computer program product of claim 10 wherein the report agent includes an interface that provides a persistent storage process for a report request.

13. The computer program product of claim 11 wherein the report agent delivers reports to clients using a down load of a file.

14. The computer program product of claim 13 wherein the report agent delivers reports to clients using an electronic mail delivery mechanism.

15. The computer program product of claim 10 wherein the report generation object includes a container object.

16. The computer program product of claim 15 wherein the container object includes the particular instance of the desktop application object, and an instance of a template object.

17. The computer program product of claim 16 wherein the container object produces a desktop application file by executing the code in desktop application object in the desktop template object on the data provided from the data services layer.

18. A networked computer system comprising:
   a plurality of client systems;
   at least one server system, said server system being coupled to the client systems by a network, said system comprising:
   a database; and
   a server process for generating reports, said process comprising:
      a data services process that maintains state information of report generation objects and transfers data from the database to satisfy report generation objects;
      an object management process that manages the report generation objects that are sent to the data services process, said object management process including:
         a report agent process that instantiates instances of a report generation object that encapsulates instances of a desktop application to produce reports based on data supplied by the data services process from retrieving said data from the database in accordance with a particular instance of the report generation object; and
      a user interface process that manages report requests that are fed to the data services process.

* * * * *